Figure 1:
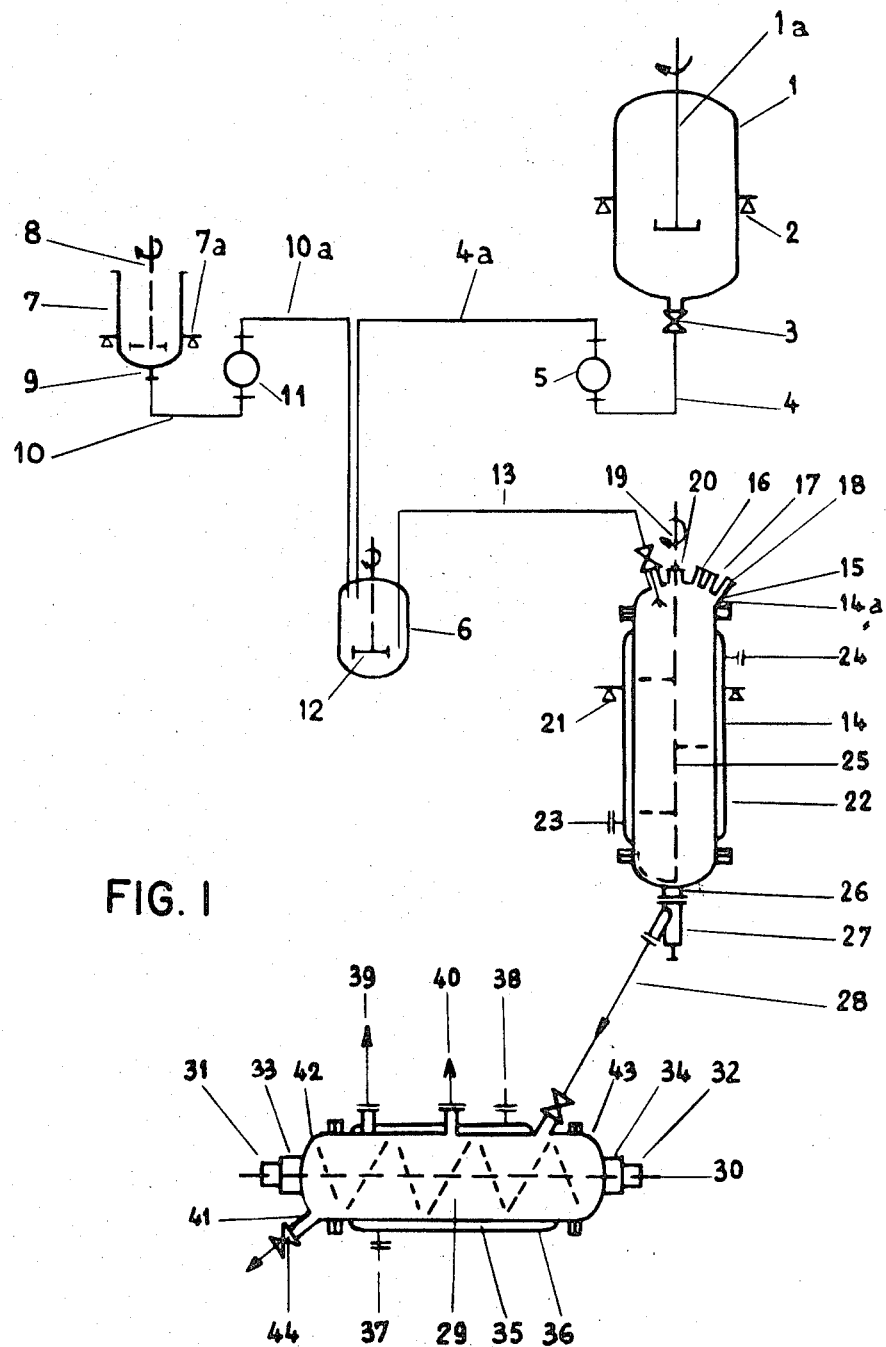

United States Patent
Chatelain et al.

[15] 3,678,021
[45] July 18, 1972

[54] PROCESS FOR PREPARING VINYL BASED POLYMERS AND COPOLYMERS INSOLUBLE IN THEIR MONOMERS

[72] Inventors: Jean Chatelain, Lyon; Salomon Soussan, Saint-Fons, both of France

[73] Assignee: Produits Chimiques Pechiney-Saint-Gobain, Neuilly-sur-Seine, France

[22] Filed: Jan. 19, 1970

[21] Appl. No.: 3,890

[30] Foreign Application Priority Data

Jan. 21, 1969 France..................................6901008
Oct. 30, 1969 France..................................6937326
Oct. 30, 1969 France..................................6937327

[52] U.S. Cl. ......................260/80.81, 260/87.1, 260/87.5 R, 260/87.5 C, 260/87.5 D, 260/87.7, 260/92.8 W, 260/92.8 R

[51] Int. Cl. ..........................................G08f 1/04, G08f 3/30
[58] Field of Search.............260/92.8 W, 87.5, 92.8 R, 80.81

[56] References Cited

UNITED STATES PATENTS 2,674,593 4/1954 Condo et al. .........................260/92.8

Primary Examiner—Joseph L. Schofer
Assistant Examiner—John A. Donohue, Jr.
Attorney—McDougall, Hersy & Scott

[57] ABSTRACT

Process for preparing vinyl based polymers and copolymers which are insoluble in their monomeric compositions comprising dispersing a small amount of a suspension of an aqueous solution of at least a portion of a catalytic system in a finely divided manner in a composition of the monomer or comonomer and then polymerizing the composition to form polymer.

2 Claims, 2 Drawing Figures

INVENTORS
JEAN CHATELAIN-SALOMON SOUSSAN
BY
M'Dougall, Hersh - Scott ATTYS

PROCESS FOR PREPARING VINYL BASED POLYMERS AND COPOLYMERS INSOLUBLE IN THEIR MONOMERS

This invention relates to the preparation of polymers and copolymers, essentially of the vinyl type, which are insoluble in the monomer or comonomer compositions.

It is an object of this invention to produce polymer and copolymer resins based on vinyl chloride having a narrow granular distribution range, and in which the average cross-section is within the range of 0.1 to 500 microns and preferably 0.2 to 200 microns.

Another object of this invention is to produce homopolymer and copolymer resins based on vinyl chloride, the elementary particles of which have high compactness. Such elementary particles can be obtained in their individual state, thereby leading to resins having high apparent density which enables good flow during extrusion of rigid polyvinyl chloride and thereby avoiding densification of the resin as previously experienced.

These elementary particles can also be reagglomerated during polymerization thereby to yield resins having lower apparent density and higher porosity, thereby to enable the use of such resins in the processing of plasticized polyvinyl chloride. Such products are free of "fish-eyes" thereby to insure good transparency.

Figure 2:
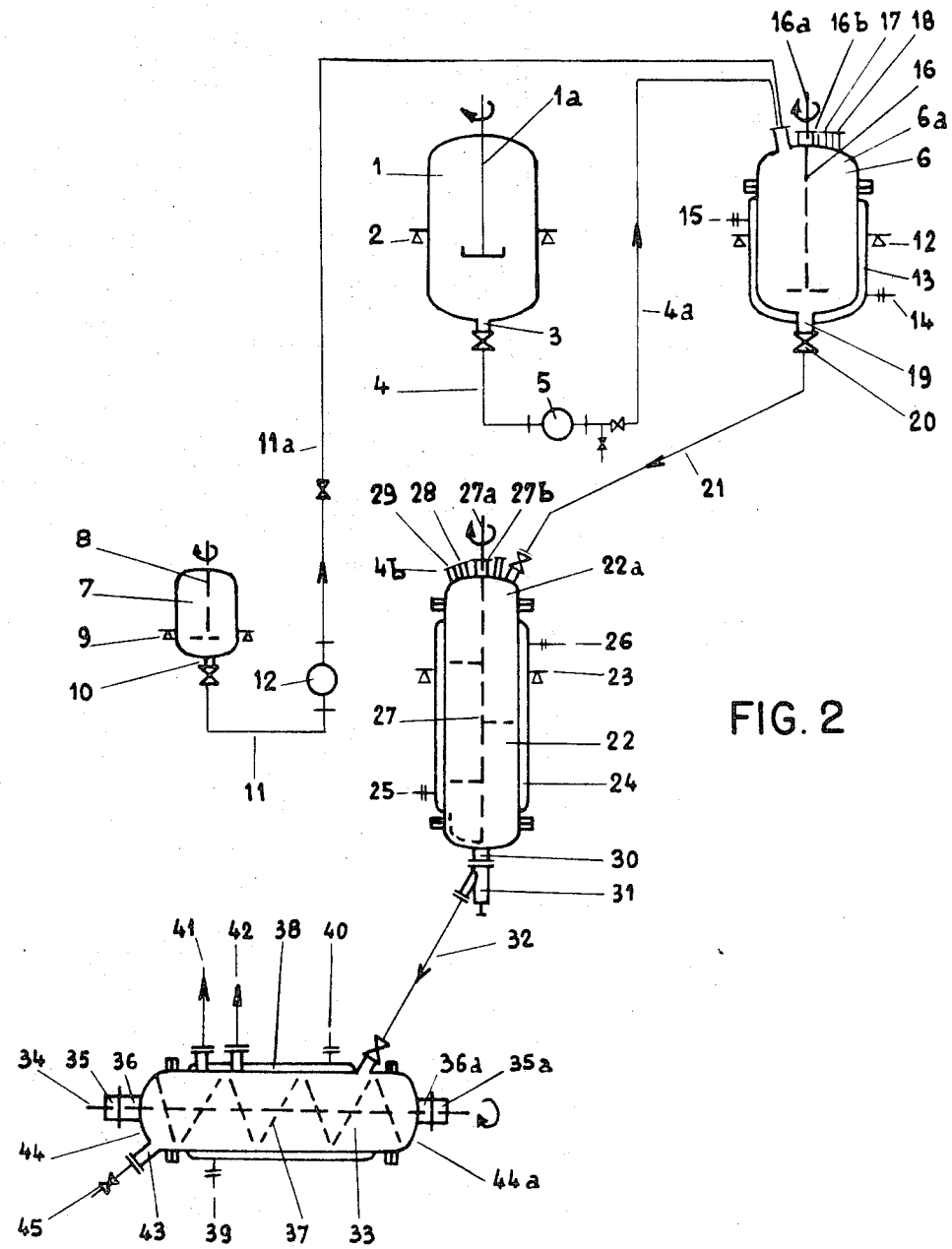

These and other objects of this invention will hereinafter appear and for purposes of illustration, but not of limitation, embodiments of the invention are shown in the accompanying drawings in which:

FIG. 1 is a diagrammatic view of apparatus employed in the process for one modification of the invention; and FIG. 2 is an arrangement of apparatus and flow diagram for another modification of the process of this invention.

In accordance with the practice of this invention, one disperses, in a finely divided manner and in small amounts, a suspension of an aqueous solution of at least a portion of a catalytic system in a monomer or comonomer composition of the vinyl type, essentially based upon vinyl chloride, after which the polymerization of the composition is carried out.

Description is hereinafter made of several alternative embodiments of the process carried out in a discontinuous operation.

A first embodiment of the process of this invention is characterized by the fact that, after the preparation of the suspension of the aqueous solution of at least a portion of the catalytic system, a finely divided dispersion thereof in the monomer or comonomer composition is first achieved and the resulting composition is subjected to a single stage polymerization condition carried out with moderate agitation.

A second alternative embodiment of the process of this invention is characterized by the fact that a finely divided dispersion of the suspension of the aqueous solution of at least a part of the catalytic system in the monomer or comonomer composition, based on vinyl chloride, is achieved jointly with the initial polymerization of the resulting composition with high turbulence with the polymerization being continued up to a conversion rate generally within the range of 1 to 50 percent and preferably 3 to 25 percent in a first stage which is followed by a second stage during which the reaction is subjected to a polymerization with slow agitation but sufficient to avoid the reagglomeration of the altering grains.

A third embodiment of the process of the invention is characterized by the fact that in an apparatus called pre-polymerizer, a finely divided dispersion of the suspension of the aqueous solution of at least a portion of the catalytic system in the monomer or comonomer composition, based upon vinyl chloride, and the pre-polymerization of the thus formed reaction medium with high agitation is carried out jointly as a first stage up to a conversion rate generally within the range of 1 to 30 percent and preferably 3 to 15 percent and then, in a second stage, after transfer to a polymerizer, the pre-polymerizate is subjected to a final polymerization with slow agitation but sufficient to avoid reagglomeration of the altering range.

In accordance with the practice of this invention, preliminary dispersion of a suspension of an aqueous solution of at least a part of the catalytic system in a monomer or comonomer composition of the vinyl type, essentially a vinyl chloride base, can be carried out in small amounts and in finely divided manner followed by dissolving the complementary portion of the catalytic system in a monomer or comonomer composition of the vinyl type and essentially based upon vinyl chloride, jointly with a polymerization in one or two stages or with a pre-polymerization followed by final polymerization, as previously described.

In the case where a catalytic system composed of several water soluble components is employed, the aqueous solution of the separate components can be introduced into the reaction mixture at different stages of the polymerization process.

Description will hereinafter be made of two particularly beneficial alternate embodiments of the process carried out in a continuous operation.

A first embodiment of the process in characterized by the fact that a suspension of an aqueous solution of at least a portion of the catalytic system in all or a portion of the monomer or comonomer composition of the vinyl type, based essentially on vinyl chloride, is achieved in a continuous fashion in a finely divided manner and in small amounts after which the polymerization of the composition is carried out in a continuous manner on contact with a predetermined amount of monomeric composition and a quantity of polymer or copolymer which has previously been prepared by the same process, the reaction medium maintained under moderate agitation in the polymerization reactor while continuously extracting polymer or copolymer from the reactor and degassing the extracted polymer and copolymer for separation from the unreacted monomer composition.

In a desirable application of this alternate embodiment of the process, the polymer/monomer ratio in the reactor should be maintained at a weight ratio within the range of 0.3 to 9 and preferably within the range of 1 to 4, by eventually adding a complementary monomeric composition free of catalyst.

In accordance with a preferred method of procedure of this alternate embodiment of the invention, the regulation of supply of monomer to the composition and removal of polymer are made interdependent in order to be able to regulate the conditions of polymerization and consequently the conversion rate and the nature of polymer or copolymer formed.

Outside the polymerization reactor, the extraction of the powdered polymer blown up with monomer can be made by various appropriate means and preferably by the process described in the French Pat. No. 1,261,921, filed on Apr. 11, 1960 in the name of the applicants. As described therein, the extraction is carried out through an orifice directly joining the polymerization enclosure with the degassing and separating circuit of the polymer. The orifice is intermittently subjected to very abrupt opening and closing over a very short period of time, with the opening and closing operations being repeated a number of times during a unit time sufficient to evacuate the desired quantity of continuously collected polymer.

For a desirable application of this alternate embodiment of the process for preparing polyvinyl chloride or copolymers based upon vinyl chloride, in order to operate with an effective agitation, it is preferred to start the continuous introduction of the monomeric composition in which the water insoluble, eventual complementary portion of the catalytic system is dissolved and that of the aqueous solution of catalyst in a certain amount of previously prepared polymer or copolymer.

This quantity of polymer or copolymer prepared before the continuous polymerization, is usually prepared either directly by polymerization in the reactor, by filling the latter with monomeric composition in which the water insoluble eventual complementary portion of the catalytic system is dissolved as by spraying with catalyst in aqueous solution or by polymerization in a separate piece of equipment.

In order to achieve, in a finely divided manner, a good dispersion of the suspension of the aqueous solution of at least a portion of the catalytic system in the monomer or comonomer composition of the vinyl type, essentially based upon vinyl chloride, use is advantageously made of a piece of apparatus equipped with a high speed rotating turbine, a mixer fitted with a spray nozzle, a diaphragm control apparatus creating pressure losses from 100 to 600 bars, and more particularly, apparatus industrially known under the name of "Manton Gaulin homogenizer".

A brief description of equipment particularly suitable for the application of this alternate embodiment of the process will now be given by way of illustration, but not by way of limitation, with reference to FIG. 1 of the drawings.

A tank 1, containing the monomeric composition in which the water insoluble eventual complementary portion of the catalytic system is dissolved, is positioned on a scale 2, such as an electronic weighing machine, and fitted with a stirrer 1a. Its lower portion is provided with a tubulure having a safety valve 3 and connected by duct 4 to a metering pump 5 which pumps the monomer through duct 4a to a homogenizer 6.

Tank 7, which is also equipped with an electronic scale 7a and with a stirrer 8, contains the mixture of water, emulsifier and the water soluble portion of the catalytic system. Tank 7 is formed with a lower portion having a tubulure 9 connected by duct 10 to a metering pump 11 which pumps the catalytic aqueous solution through duct 10a to the homogenizer 6.

The homogenizer 6 has a high speed type stirrer 12 and is connected by duct 13 for feeding the reactor 14. Upon introduction into the reactor 14, the mixture of monomeric composition, water, emulsifier and the catalytic system is finely dispersed by passage through the atomizer 15.

The vertical type reactor 14 is formed with a cover 14a for introduction of the monomeric composition 16, for evacuation of unreacted monomeric material at the processing end by degassing through duct 17, for installation of a safety device 18, and also for the passage of the upper portion of the shaft 19 for the stirrer, sealed by a stuffing box 20.

The reactor 14 is located on an electronic weighing scale 21 and is equipped with a double wall 22 to provide a jacket through which heat exchange fluid is circulated from an entrance tubulure 23 to an exit tubulure 24.

Agitation of the reaction medium is effected by the stirrer 25 which is carried by the drive shaft 19.

The polymer/monomer composition that is fabricated is extracted continuously from the lower portion of the reactor 14 through tubulure 26, provided with a ram valve 27 having a pneumatic drive.

The extracted polymer/monomer mixture is transferred through duct 28 to a getter 29.

The horizontally disposed getter 29 is traversed by a rotary shaft 30 supported at its ends by bearings 31 and 32 sealed by stuffing boxes 33 and 34.

The rotary shaft 30 bears a screw type stirrer 35 for agitation of the mixture of polymer/monomer composition in the getter 29 to enhance the elimination of the monomeric composition.

The getter 29 is equipped with a wall 36 to provide a jacket through which a heat exchange fluid is circulated from an entrance tubulure 37 to an exit tubulure 38. At the upper portion of the vat of the getter 29, a branched tubulure 39 is connected to a source of vacuum for degassing of the polymer. The getter 29 furthermore is equipped with a pressure responsive safety tubulure 40.

Polymer evacuation is carried out through tubulure 41 located in the lower portion of one of the side plates 42 and 43 of the getter 29 and preferably on the side opposite the entrance of the polymer/monomer composition. The polymer removal rate is regulated by the valve 44 and the tubulure 41.

Another alternate embodiment of the process of the invention is characterized by the fact that, in an apparatus called a pre-polymerizer, there are simultaneously achieved, in an essentially continuous manner, the dispersion of a small amount of a suspension of an aqueous solution of at least a part of the catalyst in all or a part of the monomer or comonomer composition of the vinyl type, and the pre-polymerization of the prepared reaction medium with high turbulence up to a conversion rate generally within the range of 1 to 20 percent and preferably 2 to 10 percent. AFter transfer to a polymerizer, polymerization of the pre-polymerizate is carried out continuously on contact with a predetermined quantity of monomer and a quantity of polymer or copolymer in which the latter has previously been prepared by the same process, while the reaction medium is maintained under low agitation, although sufficient to avoid reagglomeration of the polymer grains while enabling essentially continuous extraction of formed polymers or copolymers and for degassing for separation from unreacted monomer.

For application of this alternate embodiment of the process, the polymer/monomer weight ratio in the polymerizer should be maintained at values within the range of 0.3 to 9 and preferably 1 to 4, by eventually adding a complementary monomeric composition free of catalyst.

In a preferred method of procedure of the alternate embodiment of the invention, the ponderal regulation of supply of monomeric composition and removal of polymer are made interdependent in an essentially automatic manner in order to regulate the polymerization conditions and consequently the conversion rate as well as the nature of the polymer or copolymer formed.

Outside the polymerizer, the extraction of the powdered polymer blown up with monomer can be made by any appropriate means and preferably by the process described in the aforementioned French Pat. No. 1,261,921, filed on Apr. 11, 1960.

Description will hereinafter be given, with reference to FIG. 2 of the drawing, of the equipment particularly suitable for use in the alternate embodiment of the described process.

The tank 1, containing the monomeric composition in which the water insoluble, eventually complementary portion of the catalytic system is dissolved, is positioned on a weighing scale 2 and is fitted with a stirrer 1a. The lower portion of the tank is provided with a tubulure having a safety valve 3 and which is connected by duct 4 to a metering pump 5 which pumps monomer through the duct 4a to a pre-polymerizer 6.

A tank 7, also equipped with a weighing scale 9 and with a stirrer 8, contains a mixture of water, emulsifier and the water soluble portion of the catalytic system. Tank 7 is provided in its lower portion with a tubulure having a safety valve 10 connected by duct 11 to a metering pump 12 which pumps the aqueous catalytic solution through duct 11a into the pre-polymerizer 6.

The vertically disposed pre-polymerizer 6 is mounted on a weighing scale 12 and is fitted with a double wall 13 to define a surrounding jacket for the circulation of a heat exchange fluid therethrough from an entrance tubulure 14 to the exit tubulure 15. Agitation of the reaction medium in the pre-polymerizer is effected by a high speed type stirrer 16 mounted on a drive shaft 16a.

The upper cover portion 6a of the pre-polymerizer is provided with tubulures, one of which is for filling with the monomeric composition supplied through duct 4a and others of which are used for the introduction of the aqueous catalytic solution through duct 11a, for evacuation of unreacted monomer at the processing end by degassing through duct 17, for the installation of a safety device 18, and also for the passage of the upper portion of the shaft 16a for the stirrer, sealed by a stuffing box 16b.

Continuous removal of pre-polymerizate is carried out through a tubulure 19 in the lower portion of the prepolymerizer 6 which is provided with a regulating valve 20.

The polymer/monomer mixture removed from the prepolymerizer 6 is transferred through duct 21 to the polymerizer 22.

The vertically disposed polymerizer 22 is positioned on an electronic weighing scale 23 and is provided with an outer wall 24 to define a jacket through which a heat exchange fluid can be circulated from an entrance tubulure 25 to an exit tubulure 26. Agitation of the reaction medium is achieved by the stirrer 27 which is driven and supported by the shaft 27a.

The cover 22a in the upper portion of the polymerizer 22 is provided with tubulures required for the introduction of monomeric composition 4b, for the evacuation of unreacted monomer at the end of the process by degassing through duct 28, for the installation of a safety device 29, and for the passage of the upper portion of the shaft 27a of the stirrer, sealed by a stuffing box 27b.

A buffer tank, which is not represented in the drawing, can be interposed between the pre-polymerizer 6 and the polymerizer 22, in which the pre-polymerisate is maintained under agitation at a temperature within the range of 15°-20° C., corresponding to an effective pressure of about 2 bars. This permits greater operation flexibility by damping the effects of any irregularities of the operation of the pre-polymerizer 6 on the operation of the polymerizer 22.

Continuous removal of the prepared polymer/monomer composition is achieved from the lower portion of the polymerizer 22 through the tubulure 30 which is provided with a pneumatic operated ram valve 31.

The polymer/monomer mixture is then transferred through duct 32 to the getter 33.

The horizontally disposed getter 33 is traversed by a shaft 34 mounted for rotational movement in bearings 35 and 35a, which are sealed by stuffing boxes 36 and 36a respectively.

The rotary shaft 34 is provided with a helicoidal type stirrer blade 37 for agitation of the mixture of polymer/monomer in the getter 33 in order to promote the elimination of the monomeric composition.

The getter 33 is equipped with a double wall 38 to provide a jacket through which a heat exchanger fluid is circulated from an entrance tubulure 39 to an exit tubulure 40. The upper portion of the vat of the getter 33 is provided with a branched tubulure 41 connected to a vacuum means and a degassing means through which evacuation of unreacted monomeric composition can be achieved during the polymerization as well as by evacuation and degassing of the polymer. Getter 33 furthermore is equipped with a safety tubulure 42.

The polymer removed is carried through the tubulure 43, located at the lower portion of one of the side plates 44 and 44a, and preferably on the side plate opposite the entrance of the polymer/monomer composition. The polymer removal rate is regulated by a valve 45 mounted in the tubulure 43.

In the practice of the invention, it is desirable that the polymerization be initiated either discontinuously in a single step, in two stages, or in two steps, or continuously in a single or in two apparatuses, in the presence of sufficient amount of aqueous solution of the catalyst in finely divided form in order to provide an aqueous phase separate from the organic phase. In the case of the vinyl chloride polymerization, use is advantageously made of an amount of aqueous solution at least equal to 0.1 percent and being able to reach 10 percent by weight for a polymerization temperature of 60° C.

In the practice of the invention, and its various alternate embodiments, there should be introduced into the reaction medium, preferably with the suspension of the catalytic aqueous solution, an emulsifier which can be of the water-oil type. The following are representative of emulsifiers which can be used in the practice of this invention:

cationic type such as: quaternary ammonium salts having the general formula

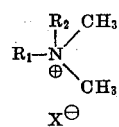

in which $R_1$ and $R_2$ or aromatic radicals and X is a halogen such as chlorine and bromine.

anionic types such as: sulphonate alkaline salts having the general formula:

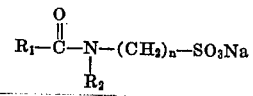

in which $R_1$, $R_2$ are aliphatic groups having from one to 20 carbon atoms and $n$ is a number between 2 and 6.

sulpho succinate types such as:

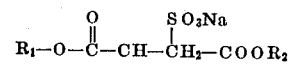

in which $R_1$, $R_2$ are aliphatic groups having from three to 15 carbon atoms.

non-ionic types such as: ethylene polyoxide grafted by styrene or vinyl acetate; polyethoxyesters of fatty acids having the general formula:

$$R - COO - (C_2H_4O)_n H$$

in which R is an aliphatic group having from five to 20 carbon atoms and $n$ is a number between 10 and 150.

For application of the polymerization process and its alternate embodiments, generally the polymerization is carried out in a reaction medium buffered to a pH within the range of 2 to 10 and preferably 4 to 8.5. As examples of buffering agents which can be used, reference can be made to the following by way of example: aqueous solutions of soda and monobasic potassium phosphate, borax and hydrochloric acid, soda and potassium acid phthalate.

In accordance with the practice of this invention, use should be made of monomers and comonomers having certain solubility in the finely dispersed aqueous phase previously described.

According to the invention, the polymer or copolymer that is formed should be insoluble in the initial monomer or comonomer system.

For practice of this invention in a particularly satisfactory manner for reaction media formed of vinyl chloride alone, vinyl chloride and at least one olefin such as ethylene, propylene, butene-1, butene-2, isobutene, methyl-4-pentene-1, vinyl chloride and vinyl acetate, vinyl chloride, vinyl acetate and at least one olefin of the type previously described, vinyl chloride and vinylidene chloride and other compounds, the polymers formed are essentially insoluble in the initial comonomeric composition.

By way of illustration, but not by way of limitation, the invention can be employed in the copolymerization of the following systems:

comonomeric compositions of vinyl chloride and at least one olefin containing from 0.1 to 30 percent by weight of olefin and preferably 0.1 to 10 percent by weight of olefin in the comonomer composition.

comonomeric compositions of vinyl chloride and vinyl acetate containing from 0.1 to 30 percent by weight vinyl acetate and preferably 0.1 to 15 percent by weight vinyl acetate.

comonomeric compositions of vinyl chloride and vinylidene chloride containing from 0.1 to 30 percent by weight and preferably 0.1 to 20 percent by weight of vinylidene chloride.

For a good application of the polymerization process and of its alternate embodiments forming the objects of this invention, catalytic systems must be used in which at least one of the components is insoluble in the organic phase of the reaction media but in which said component or components are soluble in the aqueous phase.

Among the catalytic systems capable of being used, reference can be made by way of example to the following:

persalts or hydrogen peroxide; persalts or hydrogen peroxide coupled with a mineral or organic reducing agent such as salts of metals having plural valences and more particularly iron and copper salts, rongalite (hydrosulfite-formaldehyde), bisulfites, metabisulfites, thiosulfates, sulfinates, ascorbic acid, oses and other compounds; catalytic systems, one of the components of which is soluble in vinyl chloride and slightly water soluble, the other component being water soluble and insoluble in vinyl chloride. Among the latter there may be used by way of illustration, systems formed by oxidants such as peroxide, more particularly acetylcyclohexane sulphonyl peroxide, hydroperoxides such as those of cumene and tertiobutyl activated by reducing agents such as metal salts having plural valences, especially iron or copper salts, and more particularly by salts such as bisulfites, metabisulfites, thiosulfates, sulfinates or organic reducing agents such as ascorbic acid, the oses and other compounds; systems formed by reducing components soluble in vinyl chloride and sparingly water soluble such as benzoin, acetyl-acetonates and water soluble oxidizing activation components such as persalts or hydrogen peroxide.

According to this invention, the polymerization reaction can be carried out over a wide temperature range, generally within the range of 0° to 90° C. and preferably within the range of 50° to 70° C. The polymerization can be carried out at a very low temperature by previously adding an antigelling agent, such as calcium chloride or a polyalcohol, to the suspension of the aqueous solution of at least a portion of the catalytic system that is dispersed.

The present invention also has as an object the production of new industrial products in the form of polymers and copolymers, essentially of the vinyl type, insoluble in their monomer or comonomer compositions, having, in addition to a very narrow granular distribution range, an average diameter within the range of 0.1 to 500 microns and more particularly 0.2 to 200 microns, a high compactness when the elementary particles are in their individual state thereby to yield polymers or copolymers having an apparent bulk density within the range of 0.55 to 0.90 g/cm³ or a high porosity when the elementary particles are reagglomerated, thus yielding polymers or copolymers having an apparent bulk density from 0.25 to 0.65 g/cm³.

The following examples are given by way of illustration, but not by way of limitation:

EXAMPLE 1

According to this example, first there is achieved a summary dispersion of the catalytic aqueous phase into the monomer, then this pre-dispersion is passed into a homogenizer at room temperature and then the polymerization is carried out in a single stage.

A solution of 0.2 kg of sodium dioctylsulphosuccinate and of 0.2 kg ammonium persulphate in 10 liters water is introduced into a vertical autoclave of 500 liters capacity. 250 kg of vinyl chloride are charged and one achieves a summary dispersion of the aqueous phase in the monomer at room temperature under the effect of standard agitation achieved by means of a stirrer with a helicoidal winding rotating at 150 r.p.m. This pre-dispersion is passed through a homogenizer industrially known under the name of "Manton Gaulin homogenizer", under a pressure of 200 bars.

The finely divided dispersion obtained is collected in an autoclave of 500 liters capacity, equipped with a stirrer of the standard type rotating at 150 r.p.m. The polymerization is achieved at a temperature of 60° C. The reaction lasts 10 hours until pressure begins to drop. After degassing and cooling, there is collected a polymer, the average diameter of which is between 5 and 40 microns, with a preponderance of particles of 20 microns. The polymerization yield is 65 percent. When 60 parts by weight of this polymer are mixed with 40 parts of dioctyl phthalate, there is obtained a plastisol, the viscosity of which, measured at 25° C. by means of a viscometer, industrially known under the name of "Drage viscometer", is 12,000 centipoises.

EXAMPLE 2

Into a vertical type autoclave of 200 liters capacity, equipped with a turbine type agitator, industrially known under the name "Turbine Lightning" rotating at 700 r.p.m., there are successifely introduced:
  100 kg of monomeric vinyl chloride
  2 kg water
  100 g of ammonium persulphate The effective pressure is raised by heating to 11.5 bars and the agitation is maintained for 1 hour. The conversion rate obtained is 8 percent. The suspension is transferred into a horizontal type autoclave of 500 liters capacity, equipped with a frame type rotary agitator, previously freed from the oxygen by degassing with 10 kg of monomeric vinyl chloride, and containing 100 kg of monomeric vinyl chloride. The polymerization reaction is carried on by maintaining the effective pressure at 11.5 bars for 5 hours. 180 kg of powered polymer are obtained.

EXAMPLE 3

The operation is the same as in Example 2 except for the introduction into the pre-polymerizer of 30 g of an ethylene polyoxide grafted by polystyrene. The reaction proceeds in the same manner.

The Table I hereinafter sets forth the properties of the resins obtained in Examples 2 and 3.

TABLE I

| PROPERTIES | Ex. 2 | Ex. 3 |
| --- | --- | --- |
| Apparent bulk density (g/cm³) | 0.8 | 0.6 |
| Viscosity index AFNOR according to the standard specification NFT 51013 | 84 | 84 |
| Average diameter in microns | 210 | 100 |
| Powder flow in seconds * | 17 | 24 |
| Cold plasticizer take-up (ml) | 3 | 6 |
| Fish-eyes | none | none |
| Volatile matters (%) ** | 1.4 | 0.8 |
| Thermal stability in minutes *** | 30 | 30 |

* The equipment used for this measurement is that which is described in the standard specification ASTM D1895–65T. The funnel used is completely filled and one measures the required time for the entire discharge of the funnel.

Rate of volatile matters :  is meant the loss in weight in percents of the resin maintained for 2 hours at 110° C.

*** The formulation used for the thermal stability is composed of
resin     100
mixture of 75 parts of N-dioctyl-tin and 25 parts of epoxidized soja bean oil     2
Montan wave ester partially saponified     1

A sheet is drawn on a roll-mill in 10 minutes at 180° C. Then it is placed under pressure at 190° C. There is noticed the time after which coloration appears.

EXAMPLE 4

The operation is as in Example 2 but by adding persulphate to the aqueous solution:
  40 g of sodium salt of octanoyl sulphosuccinate
  40 g of sodium salt of oleylmethyltauride
  126.5 ml of normal soda
  27.2 g of monobasic potassium phosphate ($PO_4H_2K$)

After 4 hours of polymerization under an effective pressure of 11.5 bars, 186 kg of dry resin are obtained, the properties of which are set forth in the following Table II:

TABLE II

| PROPERTIES | Product Example 4 |
| --- | --- |
| Apparent bulk density (g/cm³) | 0.45 |

| Viscosity index AFNOR according to the standard specification NFT 51013 | 82 |
| --- | --- |
| Average diameter in microns * | 133 |
| Powder flow in seconds | 26 |
| Cold plasticizer take-up (ml) | 13 |
| Volatile matters (%) | 10.38 |
| Fish-eyes | none |
| Thermal stability in minutes | 55 |

\* These grains are composed of compact and spherical reagglomerated elementary particles of 10 microns in diameter.

EXAMPLE 5

Into a pre-polymerizer of 200 liters capacity, equipped with a turbine type agitator rotating at 700 r.p.m., there are introduced 100 kg of monomeric vinyl chloride, 2 kg water, 160 g of ammonium persulphate, 80 g of sodium metabisulfite. The effective pressure is raised by heating to 8.3 bars and kept at this value for 2 hours. The conversion rate reached is from 5 to 6 percent. The material is transferred into the polymerization autoclave previously purged and which already contains 100 kg of monomeric vinyl chloride. The pressure is maintained at 8.3 bars for 10 hours. 170 kg powdered resin is collected. The properties of this resin are summed up in the following Table III:

TABLE III

| PROPERTIES | Product Example 5 |
| --- | --- |
| Apparent bulk density (g/cm$^3$) | 0.74 |
| Viscosity index AFNOR according to the standard specification NFT 51013 | 127 |
| Average diameter in microns | 280 |
| Powder flow in seconds | 17 |
| Cold plasticizer take-up (ml) | 3 |
| Volatile matters (%) | 1.0 |

EXAMPLE 6

According to this example, preparation is made of a vinyl chloride homopolymer having the viscosity index AFNOR 100 according to standard application NPT 51013.

Into a vertical type autoclave of 200 liters capacity, equipped with a "turbine Lightning" type agitator rotating at 700 r.p.m., there are successively introduced:

100 kg of monomeric vinyl chloride
2 kg water
80 kg of sodium metabisulfite
160 g of ammonium persulphate
30 g of ethylene polyoxide grafted by styrene The effective pressure is raised by heating to 9.5 bars and is maintained at this value for 1 hour and 15 minutes. The conversion rate is 12.8 percent. The suspension is transferred to a fixed horizontal type autoclave of 500 liters capacity, equipped with a frame type rotary agitator, previously purged and containing 100 kg of monomeric vinyl chloride. The polymerization reaction is carried on for 9 hours under an effective pressure of 9.5 bars. 184 kg of dry powder are obtained. The properties of the resin obtained are summed up in the following table IV:

TABLE IV

| PROPERTIES | Product Example 6 |
| --- | --- |
| Apparent bulk density (g/cm$^3$) | 0.67 |
| Viscosity index AFNOR according to the standard specification NFT 51013 | 102 |
| Average diameter in microns | 160 |
| Powder flow in seconds | 22 |
| Cold plasticizer take-up (ml) | 8 |
| Fish-eyes (rigid extrusion) | none |
| Volatile matters (%) | 0.6 |

EXAMPLE 7

According to this example there is prepared a vinyl chloride homopolymer having a viscosity index AFNOR close to 110.

The method of procedure and the introduction are identical to those in Example 6, but the effective pressure maintained in both autoclaves is 9 bars.

After 9 hours and 15 minutes of reaction including 35 minutes of pre-polymerization, 160 kg of powdered resin are collected.

The properties of this resin are summed up in the following Table V:

TABLE V

| PROPERTIES | Product Example 7 |
| --- | --- |
| Apparent bulk density (g/cm$^3$) | 0.65 |
| Viscosity index AFNOR according to the standard specification NFT 51013 | 114 |
| Average diameter in microns | 180 |
| Powder flow in seconds | 22 |
| Cold plasticizer take-up (ml) | 10 |
| Volatile matters (%) | 0.7 |

EXAMPLE 8

The operation is as in Example 7, but instead of ethylene polyoxide grafted by styrene, there are introduced:

40 g of sodium salt of octanyl sulphosuccinate
40 g of sodium salt of oleyl methyl tauride
140 ml of normal soda
24 g of monobasic potassium phosphate (PO$_4$H$_2$K)

After 8 hours of polymerization, 182 kg of dry powder are obtained. The properties of the resin obtained are given in the following Table VI:

TABLE VI

| PROPERTIES | Product Example 8 |
| --- | --- |
| Apparent bulk density (g/cm$^3$) | 0.40 |
| Viscosity index AFNOR according to the standard specification NFT 51013 | 110 |
| Average diameter in microns * | 110 |
| Powder flow in seconds | 28 |
| Cold Plasticizer take-up (ml) | 19 |
| Thermal stability in minutes | 60 |
| Volatile matters (%) | 0.20 |

\* The grains are composed of compact and spherical reagglomerated elementary particles of about 10 microns in diameter.

EXAMPLE 9

According to this example, there is prepared a copolymer of vinyl chloride and of vinyl acetate having a viscosity index AFNOR 75.

Into the autoclave of 200 liters capacity there are successively introduced:

89.5 kg of vinyl chloride
10.5 kg of vinyl acetate
140 g of ammonium persulphate
2 kg water
30 g of ethylene peroxide grafted by styrene.

The pre-polymerization lasts 1 hour and 30 minutes under an effective pressure of 11.5 bars and after transfer into the autoclave of 500 liters capacity, previously purged and filled with 100 kg of monomeric vinyl chloride, the polymerization is achieved under the same pressure in 4 hours and 45 minutes. Finally 164 kg of powdered copolymeric resin are collected, the characteristics of which are summed up in the following Table VII:

TABLE VII

| PROPERTIES | | CV/AV Copolymeric resin of Example 9 |
|---|---|---|
| Apparent bulk density (g/cm³) | | 0.75 |
| Viscosity index AFNOR according to the standard specification NFT 51013 | | 75 |
| Rate of copolymerized vinyl acetate | (%) | 4.6 |
| Average diameter in microns | | 180 |
| Temperature for having a flow at the grader of 20 g/10 mn. (°C) | | 170 |

EXAMPLE 10

According to this example, there is prepared a copolymer of vinyl chloride and of vinyl acetate having a viscosity index AFNOR close to 90.

It is carried out as described in Example 9, but furthermore there are added 90 g of sodium metabisulfite into the pre-polymerizer. The polymerization effective pressure is 9 bars.

After 50 minutes of pre-polymerization and 10 hours of polymerization there are obtained 160 kg of copolymeric resin, the characteristics of which are summed up in the following Table VIII:

TABLE VIII

| PROPERTIES | CV/AV Copolymeric resin of Example 10 |
|---|---|
| Apparent bulk density (g/cm³) | 0.71 |
| Viscosity index AFNOR according to the standard specification NFT 51013 | 92 |
| Rate of copolymerized vinyl acetate (%) | 4 |
| Average diameter in microns | 180 |
| Temperature for having a flow at the grader of 20 g/10 mn. (°C) * | 187 |

* One determines the required temperature for giving a flow of 20 g/10 mn. in an apparatus industrially known under the name of "Grader". This apparatus is composed of a cylinder having 10.45 mm in diameter, in the inside of which is moving a piston of 10.4 mm. By means of the piston, the heated resin is forced through a die of 2.1 mm in diameter under a pressure of 52 kg/cm².

EXAMPLE 11

Use is made of the equipment heretofore described with reference to FIG. 1.

Into a stainless steel vertical type reactor of 200 liters capacity, through the medium of a homogenizer and a sprayer, there are introduced 165 kg of monomeric vinyl chloride (the purge of the apparatus being carried out by degassing of 15 kg of monomeric vinyl chloride) and an aqueous solution containing 2.250 kg of demineralized water, 30 g of dioctyl sodium sulphosuccinate as emulsifier and 90 g of sodium persulphate (or potassium persulphate). The solution is buffered at a pH value of 7 by addition of 160 g of normal soda and 27 g of monobasic potassium phosphate.

The agitator speed is regulated and maintained at 50 r.p.m. The reaction medium temperature is raised rapidly to 67° C. and is maintained at this value, corresponding to an effective pressure of 11.5 bars in the reactor. This first discontinuously phase lasts 2 hours and 30 minutes to a total conversion rate of 65 to 70 percent.

Through the medium of the homogenizer and the sprayer, there are introduced continuously the monomeric vinyl chloride with a flow capacity of 30 kg/h and the aqueous solution of the emulsifier and of the catalyst with a flow capacity of 0.511 kg/h, corresponding to 1.5 percent water, 0.02 percent emulsifier and 0.06 percent of catalyst by weight, based on the monomeric vinyl chloride used. There are maintained, on the one hand, a constant weight in the reactor, and on the other hand, a total conversion rate close to 70 percent.

The polyvinyl chloride prepared is continuously extracted from the reactor with a flow capacity, expressed as dry powder, of 105 kg/h/m³ and is collected into an annexed receiver where the unreacted monomeric vinyl chloride is continuously removed by degassing.

After 20 hours continuous operation, there is collected at the getter-discharge, a powdered polymer, the main characteristics of which are the following:

| | |
|---|---|
| viscosity index AFNOR according to the standard specification NFT 51013 | 80 |
| apparent bulk density | 0.65g/cm³ |
| cold plasticizer take-up | 8 ml |

The particle size distribution of the resin obtained is given in the following Table IX:

TABLE IX

| Hollow space between meshes in microns | 630 | 500 | 400 | 315 | 250 | 200 | 160 | 100 |
|---|---|---|---|---|---|---|---|---|
| % of fines | 95 | 95 | 95 | 94 | 90 | 77 | 62 | 19 |

EXAMPLE 12

This example is similar to Example 11, but the dioctyl sodium sulphosuccinate is combined with another emulsifier which is the sodium salt of the oleylmethyltauride.

Consequently there is introduced in the reactor, an aqueous solution containing 2,250 kg of demineralized water, 30 g of dioctyl sodium sulphosuccinate, 30 g of sodium salt of the oleylmethyltauride and 90 g of sodium persulphate (or potassium persulphate). The solution is buffered to a pH value of 7 by addition of 160 g of normal soda and of 27 g of monobasic potassium phosphate. The polymerization conditions are the same as described in Example 11.

The polyvinyl chloride prepared is extracted continuously from the reactor where the total conversion rate is always close to 70 percent with a flow capacity, expressed in the form of a dry polymer, of 105 kg/h/m³ and is collected in an annexed receiver where the unreacted monomeric vinyl chloride is degassed continuously.

After 20 hours continuous operation, there is collected a powdered polymer, the main characteristics of which are the following:

| | |
|---|---|
| viscosity index AFNOR according to the standard specification NFT 51013 | close to 80 |
| apparent bulk density | 0.38g/cm³ |
| cold plasticizer take-up | 19 ml |

The particle size distribution of the resin obtained is given in the following Table X:

TABLE X

| Hollow space between meshes in microns | 630 | 500 | 400 | 315 | 250 | 200 | 160 | 100 |
|---|---|---|---|---|---|---|---|---|
| % of fines | 95 | 95 | 92 | 90 | 89 | 80 | 55 | 10 |

When these values are compared with those represented in Example 11 one may notice that the apparent bulk density of the polymer obtained with the combination of emulsifiers is distinctly lower and that the cold plasticizer take-up is higher.

EXAMPLE 13

Hereinafter there is given an example of continuous polymerization with introduction of the polymerization on a polymeric seed previously prepared by pre-polymerization in a separate apparatus.

Into a stainless steel pre-polymerizer of 200 liters working capacity, there are introduced 165 kg of monomeric vinyl chloride, the purge of the apparatus being achieved by degassing of 15 kg of monomeric vinyl chloride, the charges being identical to those mentioned in Example 11. The speed of rotation of the agitator of the flat blade turbine type is regulated at 400 r.p.m.

The reaction medium temperature is raised rapidly to 67° C. and is maintained at this value, thus corresponding to an effective pressure of 11.5 bars. After 40 minutes of prepolymerization, the conversion rate being close to 7 percent, there is achieved the transfer by gravity into the vertical reactor described in Example 11, the said reactor having previously been purged by degassing of 15 kg of monomeric vinyl chloride.

The reaction medium temperature is readjusted at 67° C. After 2 hours of polymerization, when the total conversion rate is comprised between 65 and 75 percent, the polymerization is started continuously under the same conditions as for Example 11.

The prepared polyvinyl chloride is extracted continuously from the reactor where the total conversion rate is maintained close to 70 percent with a flow capacity, expressed in the form of a dry polymer, of 105 kg/h/m$^3$ and is collected in an annexed receiver where the unreacted monomeric vinyl chloride is degassed continuously.

After 20 hours continuous operation, there is collected a powdered polymer, the main characteristics of which are the following:

| | |
|---|---|
| Viscosity index AFNOR according to the standard specification NFT 51013 | 80 |
| apparent bulk density | 0.67g/cm$^3$ |
| cold plasticizer take-up | 5 ml |

The particle size distribution of the resin obtained is given in the following Table XI:

TABLE XI

| Hollow space between meshes in microns | 630 | 500 | 400 | 315 | 250 | 200 | 160 | 100 |
|---|---|---|---|---|---|---|---|---|
| % of fines | 99 | 99 | 99 | 99 | 93 | 76 | 57 | 15 |

EXAMPLE 14

This example is the same as in Example 13, the system of emulsifiers being the same as that described in Example 12.

The polyvinyl chloride prepared is extracted continuously from the reactor where the total conversion rate is always close to 70 percent with a flow capacity, expressed in the form of a dry polymer, of 105 kg/h/m$^3$ and is collected into the annexed receiver where the unreacted monomeric vinyl chloride is degassed continuously.

After 20 hours continuous operation there is collected a powdered polymer, the main characteristics of which are the following:

| | |
|---|---|
| viscosity number AFNOR according to the standard specification NFT 51013 | close to 80 |
| apparent bulk density | 0.50g/cm$^3$ |
| cold plasticizer take-up | 14 ml |

The particle size distribution of the resin obtained is given hereinafter in Table XII.

TABLE XII

| Hollow space between meshes in microns | 630 | 500 | 400 | 315 | 250 | 200 | 160 | 100 |
|---|---|---|---|---|---|---|---|---|
| % of fines | 97 | 96 | 95 | 94 | 92 | 83 | 62 | 6 |

When these values are compared with those represented in Example 13, one may notice on the one hand that the apparent bulk density of this polymer is distinctly below that of the product obtained according to the Example 13 on the other hand that its particle size is slightly narrower.

It will be noticed that only 6 percent of the particles have dimensions below 100 microns and that the cold plasticizer take-up is 14 ml versus 5 ml for the product obtained with a single emulsifier.

EXAMPLE 15

Use is made of the equipment described hereinbefore and represented in FIG. 2.

Into a stainless steel vertical type reactor (not represented in the appending drawing 2), of 200 liters work capacity, there is introduced 165 kg of monomeric vinyl chloride (the purge of the apparatus being carried out by degassing of 15 kg of monomeric vinyl chloride) and an aqueous solution containing 2,250 kg of demineralized water, 60 g of emulsifier of which 30 g of dioctyl sodium sulphosuccinate and 30 g of sodium salt of oleyl methyl tauride and 90 g of ammonium persulphate (or potassium persulphate), the said solution being buffered at a pH value of 7 by addition of 160 g of normal soda and of 27 g monobasic potassium phosphate.

The speed of rotation of the flat blade turbine type agitator is regulated and maintained at 400 r.p.m. The reaction medium temperature is raised and maintained at 67° C., corresponding to an effective pressure of 11.5 bars. This first discontinuous phase lasts 40 minutes to reach a conversion rate of 7 to 9 percent.

Transfer by gravity is made into a vertical polymerizer of 200 liters work capacity, previously purged by degassing of 15 kg of monomeric vinyl chloride.

The agitator speed of rotation in the polymerizer being regulated at 40 r.p.m., the reaction medium temperature is raised rapidly to 65° C. and is maintained at this value, corresponding to an effective pressure of 11.3 bars. This phase is also discontinuous and lasts 2 hours to reach a conversion rate of 65 to 75 percent.

One hour and 15 minutes after the start polymerization in the polymerizer, there are introduced into the prepolymerizer of 25 liters work capacity, 16.5 kg of monomeric vinyl chloride (the purge of the apparatus being carried out by degassing of 1.5 kg of monomeric vinyl chloride) and the aqueous solution buffered at a pH value of 7 by addition of 16 g of normal soda and 2.7 g of monobasic potassium phosphate containing 225 g of demineralized water, 3 g of dioctyl sodium sulphosuccinate, 3 g of sodium salt of oleylmethyl tauride and 9 g of ammonium persulphate (or potassium persulphate).

The speed of revolution of the agitator in the prepolymerizer is regulated and maintained at 700 r.p.m. The reaction medium temperature is raised and maintained at 70° C. corresponding to an effective pressure of 11.8 bars. This still discontinuous phase lasts 30 minutes to reach a conversion rate close to 7 percent.

Simultaneously there is introduced continuously, on the one hand into the pre-polymerizer, the monomeric vinyl chloride with a flow capacity of 30 kg/h and the aqueous solution of the emulsifiers and of the catalyst with a flow capacity of 0.517 kg/h, corresponding to 1.5 percent by weight water, 0.04 percent emulsifiers and 0.06 percent catalyst, based on the monomeric vinyl chloride used, and on the other hand into the polymerizer, the polymer/monomer mixture coming from the pre-polymerizer with a flow capacity of 30.517 kg/h.

On the one hand a constant weight is maintained in the prepolymerizer and the polymerizer, and on the other hand a conversion rate of 6 percent and of 65 to 70 percent respectively.

The polyvinyl chloride prepared is extracted continuously from the polymerizer with a flow capacity, expressed in the form of a dry polymer, of 95 to 105 kg/h/m$^3$ and is collected in an annexed receiver where the unreacted monomeric vinyl chloride is degassed continuously.

There is collected a powdered polymer, the main characteristics of which are the following, after a continuous operation of 20 hours:

| | |
|---|---|
| viscosity index AFNOR according to the standard specification NFT 51013 | 80 to 85 |
| apparent bulk density | 0.55/g/cm$^3$ | cold plasticizer take-up    11 ml

The particle size distribution of the resin obtained is given hereinafter in Table XIII:

TABLE XIII

| Hollow spaces between meshes in microns | 630 | 500 | 400 | 315 | 250 | 200 | 160 | 100 |
|---|---|---|---|---|---|---|---|---|
| % of fines | 98 | 95 | 95 | 93 | 91 | 85 | 60 | 20 |

EXAMPLE 16

This example is similar to Example 15 and makes use of the same equipment but use is made of only a single emulsifier, the dioctyl sodium sulphosuccinate, at a dosage of 0.2 percent by weight based on the monomeric vinyl chloride used.

The conditions of pre-polymerization and of polymerization (charges, agitation, temperatures) are the same as described in Example 15. During the continuous phase, the flow capacity of the monomeric vinyl chloride is 30 kg/h and the flow capacity of the aqueous solution of the emulsifier and of the catalyst is 0.511 kg/h, thus corresponding to 1.5 percent of water, 0.02 percent of emulsifier and 0.06 percent of catalyst, in per cent by weight based on the monomeric vinyl chloride used.

The polyvinyl chloride prepared is extracted continuously from the polymerizer where the total conversion rate is close to 70 percent with a flow capacity, expressed in the form of a dry polymer, of 105 kg/h/m$^3$ and is collected into the annexed receiver where the unreacted monomeric vinyl chloride is degassed continuously.

There is collected a powdered polymer, the main characteristics of which are the following, after a continuous operation of 20 hours:

| | |
|---|---|
| viscosity index AFNOR according to the standard application NFT 51013 | 80 to 85 |
| apparent bulk density | 0.68g/cm$^3$ |
| cold plasticizer take-up | 5 ml |

The particle size distribution of the resin obtained is given hereinafter in Table XIV:

TABLE XIV

| Hollow space between meshes in microns | 630 | 500 | 400 | 315 | 250 | 200 | 160 | 100 |
|---|---|---|---|---|---|---|---|---|
| % of fines | 98 | 97 | 96 | 94 | 92 | 80 | 40 | 0 |

When these values are compared with those represented in Example 15 one may notice
- on the one hand that the apparent bulk density of the polymer is distinctly above that of the product obtained according to the Example 15
- on the other hand that its particle size range is narrower and that the average diameter of the grains is above that of the product obtained according to the Example 15. It is noticed that 80 percent of the particles have dimensions between 100 and 200 microns.

EXAMPLE 17

Use is made of the same equipment as that used in Examples 15 and 16.

Into a stainless steel vertical reactor of 200 liters work capacity, there are introduced 140 kg of monomeric vinyl chloride (the purge of the apparatus being carried out be degassing of 15 kg of monomeric vinyl chloride) and an aqueous solution containing 1.875 g of demineralized water, 50 g of emulsifiers composed of 25 g of dioctyl sodium sulphosuccinate and 25 g of sodium salt of oleyl methyl tauride and 75 g of ammonium persulphate (or potassium persulphate), the said solution being buffered at a pH value of 7 by addition of 133 g of normal soda and of 22 of monobasic potassium phosphate.

The agitator speed is regulated and maintained at 400 r.p.m. The reaction medium temperature is raised rapidly to 60° C. and is maintained at this value, corresponding to an effective pressure of 9 bars. This first discontinuous phase lasts one hour to reach a conversion rate of 4 to 6 percent.

Transfer is made into the vertical polymerizer of 200 liters work capacity, previously purged by degassing of 15 kg of monomeric vinyl chloride.

The agitator speed in the polymerizer being regulated at 40 r.p.m., the reaction medium temperature is raised and maintained at 60° C., corresponding to an effective pressure of 9 bars. This phase is also discontinuous and lasts 6 hours to reach a conversion rate of 65 to 75 percent.

Four hours after the start of the polymerization in the polymerizer, into a pre-polymerizer of 25 liters capacity, there is introduced 16.5 kg of monomeric vinyl chloride (the purge of the apparatus being achieved by degassing of 1.5 kg of monomeric vinyl chloride) and the aqueous solution buffered at the pH value of 7 by addition of 16 g of normal soda and of 2.7 g of monobasic potassium phosphate, containing 225 g of demineralized water, 3 g of dioctyl sodium sulphosuccinate, 3 g of sodium salt of oleyl methyl tauride and 9 g of ammonium persulphate (or potassium persulphate).

The agitator speed of the pre-polymerizer is regulated and maintained at 700 r.p.m. The reaction medium temperature is raised and maintained at 60° C., corresponding to an effective pressure of 9 bars. This still discontinuous phase lasts 1 hour to reach a conversion rate of 4 to 6 percent.

Then the continuous phase is started. The flow capacity of the monomeric vinyl chloride is 15 kg/h and the flow capacity of the aqueous solution of the emulsifiers and of the catalyst is 0.258 kg/h, thus corresponding to 1.5 percent water, 0.04 percent emulsifiers and 0.06 catalyst by weight, based on the monomeric vinyl chloride used.

The prepared polyvinyl chloride is extracted continuously from the polymerizer where the total conversion rate is always close to 65 percent with a flow capacity, expressed in the form of a dry polymer, of 50 kg/h/m$^3$ and is collected in an annexed receiver where the unreacted monomeric vinyl chloride is degassed continuously.

There is collected a powdered polymer, the main characteristics of which are the following, after a continuous operation of 20 hours:

| | |
|---|---|
| viscosity index AFNOR according to the standard specification NFT 51013 | 105 to 110 |
| apparent bulk density | 0.38 to 0.44 g/cm$^3$ |
| cold plasticizer take-up | 15 to 20 ml |

The particle size distribution of the resin obtained is given hereinafter in Table XV:

TABLE XV

| Hollows space between meshes in microns | 630 | 500 | 400 | 315 | 250 | 200 | 160 | 100 |
|---|---|---|---|---|---|---|---|---|
| % of fines | 97 | 97 | 96 | 94 | 91 | 86 | 40 | 2 |

We claim:

1. A process for preparing vinyl-based homopolymers and copolymers which are insoluble in their monomeric compositions comprising the steps of homogenizing uniformly to disperse from 0.1 to 10 percent by weight of an aqueous solution of at least a portion of a water-soluble catalytic system in a finely divided manner in a composition of the monomer or comonomers and then polymerizing the composition to form a polymer at a temperature within the range of 0°–90° C.

2. The process as claimed in claim 1 in which the monomer or comonomer is based upon vinyl chloride.

3. The process as claimed in claim 1 in which the polymerization reaction is a single stage polymerization carried out with moderate agitation.

4. The process as claimed in claim 1 in which the dispersion of the suspension of the aqueous solution of a portion of the catalytic system in the monomeric composition is carried out jointly with the initiation of polymerization under high turbulence to a conversion rate within the range of 1 to 50 percent in a first stage and then polymerizing with slow agitation sufficient to prevent reagglomeration of the polymer particles in a second stage.

5. The process as claimed in claim 4 in which the initial polymerization in the first stage is carried to a conversion rate within the range of 3 to 25 percent.

6. The process as claimed in claim 1 which includes the step or pre-polymerizing the dispersion of the suspension of the aqueous solution of at least a portion of the catalytic system in the monomer or comonomer composition under high turbulence to a conversion rate within the range of 1 to 30%, transferring the pre-polymerizate to a polymerizer and continuing polymerization to final polymerization under slow agitation sufficient to prevent reagglomeration of the polymer particles that are formed.

7. The process as claimed in claim 6 in which the pre-polymerization is carried to a conversion rate within the range of 3 to 15 percent.

8. The process as claimed in claim 1 which includes the additional step of dissolving the remainder of the catalytic system in a composition of the monomer or comonomers and carrying out the polymerization in one stage, as claimed in claim 3.

9. The process as claimed in claim 1 which includes the additional step of dissolving the remainder of the catalytic system in a composition of the monomer or comonomers and then carrying out the polymerization in two stages as claimed in claim 4.

10. The process as claimed in claim 1 which includes the additional step of dissolving the remainder of the catalytic system in a composition of the monomer or comonomers, and carrying out the polymerization with pre-polymerization as claimed in claim 6.

11. The process as claimed in claim 1 in which, when the catalytic system is formed of a number of water soluble components, the aqueous solution of separate components are separately introduced in the reaction mixture at various stages of the polymerization.

12. The process as claimed in claim 1, characterized by the fact that there is achieved in an essentially continuous manner, the dispersion in small amounts of a suspension of an aqueous solution of at least a part of a catalytic system in the whole or part of a monomeric or comonomeric composition of the vinyl type, then continuously polymerizing the said composition on contact with a determined quantity of monomeric composition and of a quantity of polymer or copolymer, the latter being previously prepared by the same process, the reaction medium being maintained under moderate agitation in the polymerization reactor, while in an essentially continuous manner extracting the polymers or copolymers formed and then degassing in order to separate them from the unreacted monomeric composition.

13. The process as claimed in claim 12 characterized by the fact that in the polymerization reactor the polymer/monomer weight ratio is maintained at values between 0.3 and 9 by eventually adding a complementary monomeric composition free of catalyst.

14. The process as claimed in claim 12 characterized by the fact that in the polymerization reactor the polymer/monomer weight ratio is maintained at values between 1 and 4 by eventually adding a complementary monomeric composition free of catalyst.

15. The process as claimed in claim 1 characterized by the fact that in a pre-polymerizer there are achieved jointly in an essentially continuous manner, the dispersion and in small quantities of a suspension of an aqueous solution of at least a part of the catalytic system in the whole or part of a monomeric or comonomeric composition of the vinyl type, and the pre-polymerization of the thus constituted reaction medium under high turbulence agitation, up to a conversion rate generally comprised between 1 and 20 percent, then after transfer into a polymerizer continuously polymerizing the prepolymerizate on contact with a determined quantity of monomeric composition and of a quantity of previously prepared polymer or copolymer, the reaction medium being maintained under slow agitation sufficient to avoid the reagglomeration of the altering grains while continuously extracting the polymers or copolymers formed as also their degassing in order to separate them from the unreacted monomeric composition.

16. The process as claimed in claim 15 characterized by the fact that in the polymerizer the polymer/monomer ratio by weight is maintained at values between 0.3 and 9 by adding a complementary monomeric composition free of catalyst.

17. The process as claimed in claim 1 characterized by the fact that the start of the polymerization operation is achieved in the presence of a sufficient amount of catalytic aqueous solution in finely divided form to provide an aqueous phase different from the organic phase.

18. The process as claimed in claim 1 characterized by the fact that through the medium of the suspension of the catalytic aqueous solution, there is introduced into the reaction medium an emulsifier selected from the group consisting of emulsifiers of the cationic type, of the anionic type, of the non-ionic type.

19. The process as claimed in claim 18 in which the emulsifier of the cationic type is a quaternary ammonium salt.

20. The process as claimed in claim 18 in which the emulsifier of the anionic type is an alkaline salt of a sulphonate or sulphosuccinate.

21. The process as claimed in claim 18 in which the emulsifier of the non-ionic type is an ethylene polyoxide grafted by styrene or vinyl acetate.

22. The process as claimed in claim 1 characterized by the fact that the polymerization is carried out in a medium buffered to a pH from 2 to 10.

23. The process as claimed in claim 1 characterized by the fact that the polymerization is carried out in a medium buffered to a pH from 4 to 8.5.

24. The process as claimed in claim 1 characterized by the fact that monomeric or comonomeric compositions are selected from the group consisting of vinyl chloride; vinyl chloride and vinyl acetate; vinyl chloride and at least an olefin; vinyl chloride and vinylidene chloride; vinyl chloride, vinyl acetate and at least one olefin, in which the copolymers formed are essentially insoluble in the initial compositions.

25. The process as claimed in claim 24 in which the olefin is selected from the group consisting of ethylene, propylene, butene-1, butene-2, isobutene and methyl-4-pentene-1.

26. The process as claimed in claim 1 characterized by the fact that a catalytic system is used in which at least one of the components is insoluble in the organic phase of the reaction medium and soluble in the aqueous phase.

27. The process as claimed in claim 1 characterized by the fact that the catalytic system is selected from the group formed of persalts or hydrogen peroxide combined with a mineral or organic reducing agent; catalytic systems one of the components of which is soluble in vinyl chloride and slightly water soluble, the other component being water soluble and insoluble in vinyl chloride; systems formed by reducing components soluble in vinyl chloride and sparingly water soluble and water soluble oxidizing activation components.

28. The process as claimed in claim 1 characterized by the fact that the polymerization is carried out at temperatures within the range of 0° to 90° C.

29. The process as claimed in claim 1 in which the polymerization is carried out at a temperature within the range of 50° to 70° C.

30. The process as claimed in claim 1 in which the polymerization temperature is below 0° C. when addition is made of an anti-gelling agent.

31. The process as claimed in claim 15 in which the conversion rate is within the range of 2 to 10 percent.

32. The process as claimed in claim 16 in which the polymer to monomer ratio by weight is maintained within the range of 1 to 4.

* * * * *

UNITED STATES PATENT OFFICE
CERTIFICATE OF CORRECTION

Patent No. 3,678,021  Dated July 18, 1972

Inventor(s) Jean Chatelain et al.

It is certified that error appears in the above-identified patent and that said Letters Patent are hereby corrected as shown below:

column 6, line 1, after "$R_2$" insert --- are aliphatic ---

Signed and sealed this 26th day of December 1972.

(SEAL)
Attest:

EDWARD M. FLETCHER, JR.
Attesting Officer

ROBERT GOTTSCHALK
Commissioner of Patents